United States Patent [19]

Mori et al.

[11] Patent Number: 4,992,191

[45] Date of Patent: Feb. 12, 1991

[54] SPHERE-LIKE MAGNETITE PARTICLES AND A PROCESS FOR PRODUCING THE SAME

[75] Inventors: Keiso Mori, Hiroshima; Masaru Kawabata, Saeki; Masao Kunishige, Hiroshima; Nanao Horiishi, Hiroshima; Koji Toda, Hiroshima, all of Japan

[73] Assignee: Toda Kogyo Corporation, Hiroshima, Japan

[21] Appl. No.: 296,280

[22] Filed: Jan. 11, 1989

Related U.S. Application Data

[63] Continuation of Ser. No. 45,809, Apr. 29, 1987, abandoned, which is a continuation of Ser. No. 714,676, Mar. 21, 1985, abandoned.

[30] Foreign Application Priority Data

Dec. 27, 1984 [JP] Japan .................................. 59-279558

[51] Int. Cl.$^5$ ............................................. H01F 1/11
[52] U.S. Cl. .................................................. 252/62.59
[58] Field of Search ...................... 423/632; 252/62.56, 252/62.59

[56] References Cited

U.S. PATENT DOCUMENTS 802,928 10/1905 Fireman .............................. 423/632

FOREIGN PATENT DOCUMENTS

| 668 | 1/1969 | Japan . | |
|---|---|---|---|
| 35900 | 4/1974 | Japan . | |
| 44298 | 4/1976 | Japan ............................... | 252/62.59 |
| 2226 | 1/1983 | Japan . | |

OTHER PUBLICATIONS

Hunter, "A Multipurpose Photoelectric Reflectometer". J. Opt. Soc. Am., vol. 30, pp. 536–559 (1940).
Foner, "Versatile and Sensitive Vibrating-Sample Magnetometer", The Review of Scientific Instruments, vol. 30, No. 7, pp. 548–557 (1959).
Journal of the Japan Society of Powder and Powder Metallurgy—Autumn 1971 Meeting. Translated Summary of Lecture.

*Primary Examiner*—Jeffrey E. Russel
*Attorney, Agent, or Firm*—Cushman, Darby & Cushman

[57] ABSTRACT

Disclosed herein are sphere-like magnetite particles showing an apparent density of from 0.40 to 1.00 g/cm$^3$ and a high thermo-stability and containing from 0.1 to 5.0 atomic % of Si to Fe, and a process for producing the sphere-like magnetite particles.

2 Claims, 3 Drawing Sheets

(× 20000)

(× 20000)

(× 20000)

(× 20000)

(× 20000)

SPHERE-LIKE MAGNETITE PARTICLES AND A PROCESS FOR PRODUCING THE SAME

This is a continuation of application Ser. No. 07/045,809, filed Apr. 29, 1987, now abandoned, which is a continuation of application Ser. No. 06/714,676, filed Mar. 21, 1985, now abandoned.

BACKGROUND OF THE INVENTION

This invention relates to sphere-like magnetite particles showing an apparent density of from 0.40 to 1.00 g/cm$^3$ and containing from 0.1 to 5.0 atomic % of Si to Fe and excellent in thermo-stability and dispersibility, and relates to a process for producing the sphere-like magnetite particles.

The sphere-like magnetic particles powder is mainly used as the black pigment for paints and the magnetic toner material for electrostatic reproduction.

Heretofore, magnetite particles powder has generally been used broadly as the black pigment and, in view of the improvement in the working efficiency for the current demand on energy-saving and the enhancement in the physical property of the coated films, improvement in the dispersibility of the magnetite particles powder into vehicles has been more and more demanded in the production of paints.

In the production of the paint, the dispersibility of pigment into the vehicles greatly influences the working efficiency in the paint production step and also constructs an extremely important factor for determining the various physical properties of coated films.

This fact is apparent, for example, from the descriptions on page 8 of Shikizai Kyokai-shi (Journal of the Japan Society of Color Material) vol. 49, No. 1 (1976) are follows. "... Briefly speaking, it may not be exaggeration to say that various properties required for the coated films are mostly determined by the dispersibility of a pigment used therein if the same pigment is used. If the dispersibility of a pigment in the coated film is better, it is clear from the theory that its color becomes clear, and those fundamental properties of the pigment such as the tinting strength and the hiding power can also be improved. Further, the gloss, clearness, mechanical property, gas barrier property, etc. of the coated films can also be improved and as the results the durability of the coated film can be improved. It will thus be understood that the dispersibility of the pigment in the coated films is an extremely important factor that determines the various physical properties of the painted films."

On the other hand, with the remarkable wide spread use of electrostatic copying machines in recent years, extensive research and development have been conducted for the magnetic toners as the developer, and the improvement in the performance of the magnetic toners have been demanded.

For instance, Japanese Patent Application Laid-Open No. 122129/1979 describes as follows. "... Magnetic toners are produced by incorporating a considerable amount of the magnetic particles into the toner binder. However, since the dispersibility of the magnetic particles into the toner binder resin is poor, it is difficult to produce uniform toners with no scattering in the quality upon production of magnetic toners. Further, in the case of the insulative toners, this causes the reduction of electric resistance of the toners". It is also described in Japanese Patent Publication No. 21656/1978 as follows.

"... It is possible to obtain an adequate magnetization required for visualizing the static images by the uniform distribution of iron oxide over the entire developer particles."

The magnetic toners are generally manufactured by melting and kneading magnetic particles such as magnetite particles and a resin under heating, cooling to solidify the mixture, pulverizing the cooled material and further passing the pulverized material in an atomized state through a hot air stream to perform spheroidizing treatment. Further, upon development, heat-fixing or pressure-fixing is carried out for fixing the magnetic toners.

Accordingly, the magnetite particles as the material for use in magnetic toners are exposed to a high temperature during production and development of the magnetic toners as described above, and as the results, the black magnetite particles are turned into brown maghemite particles at a temperature from about 200° C. to about 300° C., further into reddish brown hematite particles at a temperature of about 500° C. and, at the same time, the particles lose their magnetic property. Therefore, magnetite particles with excellent thermo-stability have been demanded.

It has been known that upon producing magnetic particles by blowing an oxygen-containing gas through an aqueous reaction suspension containing ferrous hydroxide which has been obtained by reacting an aqueous ferrous solution and an alkali, the shape of the produced magnetite particles varies depending on the pH value in the aqueous reaction suspension.

This fact is apparent from the descriptions in "The Summary of Lecture in 1971's Autumn Meeting of Journal of the Japan Society of Powder and Powder Metallurgy", p.112, lines 14–19 as follows.

"An aqueous sodium hydroxide solution (40–44 g/0.3 l) was added to an aqueous suspension of ferrous sulfate (139 g/ 0.7 l) while blowing air under agitation and the reaction mixture was warmed to 50° C. for 5 hours to obtain fine particles. The pH value of the suspension was changed for varying the shape of the particles. The pH value was adjusted by controlling the amount of sodium hydroxide to obtain pseudo-hexahedral particles in the acidic region (NaOH: 40–41 g/0.3 l), octahedron particles in the alkaline region (NaOH: more than 43 g/0.3 l) and polyhedral sphere-like particles in the neutral region (NaOH: 42 g/0.3 l)", as well as from the descriptions in the claim of Japanese Patent Publication No. 668/1969 as follows. "... producing precipitates comprising black ferromagnetic particles (magnetite particles) of granular or cubical (hexahedral) shape .... by maintaining the aqueous suspension containing colloidal Fe(OH)$_2$ at a pH not less than 10 to a temperature in the range of 45 to 70° C., and carrying out oxidation reaction under the state where precipitated particles present in the liquid are put to sufficient movement by the agitation".

Although it has been most keenly demanded at present to provide magnetite particles excellent in the dispersibility and the thermo-stability, the particles obtained by the foregoing known methods for producing the magnetic particles can not yet be considered excellent in the dispersibility and the thermo-stability.

For instance, Japanese Patent Application Laid-Open No. 35900/1974 discloses a process for producing sphere like magnetic particles from the entire amount of Fe$^{+2}$ in the aqueous suspension of ferrous salt.

Namely, the process as disclosed in Japanese Patent Application Laid-Open No. 35900/1974 comprises a first step of adding alkali metal carbonate to an aqueous mixed solution of a water soluble divalent metal salt ($Fe^{+2}$ is entirely or partially substituted with divalent metal such as $Co^{+2}$) and a ferrous salt, by an amount less than the equivalent to acid radicals contained in an aqueous mixed solution and carrying out oxidation reaction at a temperature lower than the boiling point thereby forming the matrix of ferromagnetic particles, and a second step of adding an alkali metal hydroxide in an amount sufficient to precipitate all of the unreacted metal ions remaining in the solution on the matrix of the ferromagnetic particles thereby forming ferromagnetic particles (in which $MOFe_2O_3$, $M:Fe^{+2}$ is partially or entirely substituted with divalent metal such as $Co^{+2}$).

However, magnetite particles obtained by the above-mentioned process are still not satisfactory in view of the sphericalness of magnetite particles as shown in the Comparative Example 3 described later, in which the resultant particles are coagulated with each other and have only a low apparent density. This may be attributable to the fact that the magnetite particles obtained by the process as disclosed in Japanese Patent Application Laid-Open No. 35900/1974 are formed by hydrolysis reaction of the iron carbonate obtained from a ferrous sulfate and an alkali metal carbonate in the first step and accordingly, magnetite particles are precipitated rapidly and as the result, it is difficult to sufficiently control the shape of the particles.

Furthermore, in the case of forming the sphere like magnetite particles in the aqueous solution of the neutral pH range, since it is difficult to entirely convert $Fe^{2+}$ present in the aqueous suspension of ferrous salt into magnetite particles and unreacted $Fe^{2+}$ partially remains therein, the production yield is lowered and, in addition, unreacted $Fe^{2+}$ causes public pollution due to the discharge water, and as the results, an adequate countermeasure therefor is required.

However, in order to entirely convert $Fe^{2+}$ present in the aqueous suspension of ferrous salt into the magnetite particles for improving the yield, the aqueous suspension of ferrous salt has to be reacted with an alkali in an amount more than the equivalent to the ferrous salt in the aqueous suspension. In this case, an alkali reaction solution at a pH value of higher than about 11 is formed, in which the resultant magnetite particles are hexahedral or octahedral particles having a low apparent density, an increased oil absorption and insufficient dispersibility and tinting strength.

The present inventors, taking notice of the shape of the magnetite particles, considered that magnetic particles with excellent dispersibility and high coloring value are those sphere-like particles showing a high apparent density and a low oil absorption, that the improvement in the sphericalness of the magnetite particles can decrease the area of contact between the particles to reduce the coagulation between the particles and increase the apparent density and as the result, the magnetite particles with excellent dispersibility are provided Then, the inventors have made various studies on the process for producing sphere-like magnetite particles showing an improved sphericalness from the entire content of $Fe^{2+}$ present in the aqueous suspension of ferrous salt and have attained the present invention.

SUMMARY OF THE INVENTION

In a first aspect of the present invention, there are provided sphere-like magnetite particles showing an apparent density of from 0.40 to 1.00 $g/cm^3$ and a high thermo-stability and containing from 0.1 to 5.0 atomic % of Si to Fe.

In a second aspect of the present invention, there is provided a process for producing sphere-like magnetite particles containing Si, comprising Oxidizing $Fe(OH)_2$ in an aqueous suspension at a temperature from 70 to 100° C. by blowing an oxygen-containing gas into the aqueous suspension containing colloidal $Fe(OH)_2$ obtained by reacting an aqueous solution of a ferrous salt with an alkali hydroxide of from 0.80 to 0.99 equivalent to $Fe^{2+}$ in the aqueous solution of a ferrous salt, wherein a watersoluble silicate is added into the alkali hydroxide or into the aqueous suspension containing colloidal $Fe(OH)_2$ before blowing the oxygen-containing gas thereto in an amount of from 0.1 to 5.0 atomic % (calculated as Si) to Fe of the ferrous salt, thereby forming particles of sphere-like magnetite, adding an alkali hydroxide of more than 1.00 equivalent to residual $Fe^{2+}$ in an aqueous suspension after the oxidation reaction to the aqueous suspension, and subjecting the resultant aqueous suspension to oxidation treatment by blowing an oxygen-containing gas at a temperature from 70 to 100° C.

BRIEF DESCRIPTION OF THE DRAWINGS

FIG. 1 through FIG. 5 are, respectively, electron microscopic photographs ($\times 20,000$) showing the particle structures of magnetite particles, in which FIG. 1 and FIG. 2 show sphere-like magnetite particles obtained in Example 1 and Example 3 respectively, FIG. 3 shows hexahedral particles obtained in Comparative Example 1, FIG. 4 shows amorphous magnetite particles obtained in Comparative Example 2, and FIG. 5 shows magnetite particles with unsatisfactory sphericalness obtained in Comparative Example 3.

Figure 1:
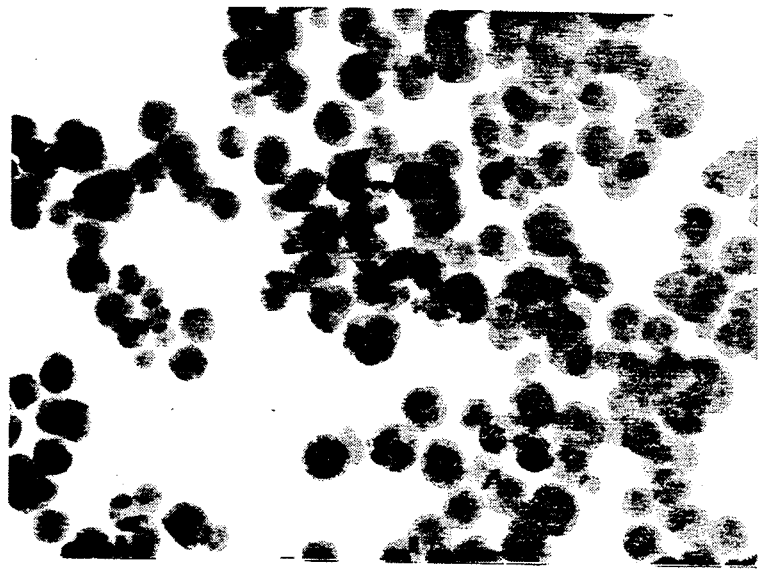

DETAILED DESCRIPTION OF THE INVENTION:

The present invention relates to sphere-like magnetite particles showing an apparent density of from 0.40 to 1.00 $g/cm^3$ and a high thermo-stability and containing from 0 1 to 5.0 atomic % of Si to Fe, and a process for producing sphere-like magnetite particles showing an apparent density of from 0.40 to 1.00 $g/cm^3$ and a high thermo-stability and containing from 0.1 to 5.0 atomic % of Si to Fe, in which the process comprises oxidizing $Fe(OH)_2$ in an aqueous suspension at a temperature from 70° to 100° C. by blowing an oxygen-containing gas into an aqueous suspension containing colloidal $Fe(OH)_2$ obtained by reacting an aqueous solution of a ferrous salt with an alkali hydroxide of from 0.80 to 0.99 equivalent to $Fe^{2+}$ in the aqueous solution of a ferrous salt, wherein a water soluble silicate is added into the alkali hydroxide or into the aqueous suspension containing colloidal $Fe(OH)_2$ before blowing the oxygen-containing gas thereto in an amount of from 0.1 to 5.0 atomic % (calculated as Si) to Fe of the ferrous salt, thereby forming particles of sphere-like magnetite (first reaction step), and adding an alkali hydroxide of more than 1.00 equivalent to residual $Fe^{2+}$ in the aqueous suspension after the oxidation reaction to the aqueous suspension and subjecting the resultant aqueous suspension to oxidation treatment by blowing an oxygen-containing gas at a temperature from 70° to 100° C. (second reaction step).

Specifically, the sphere-like magnetite particles according to the present invention show an apparent density of from 0.40 to 1.00 g/cm$^3$ an oil absorption value of 15 to 21 ml/100 g, a tinting strength (L value) of 33.0 to 37.1, and a high thermo-stability and containing from 0.1 to 5.00 atomic % of Si to Fe. Since the sphericalness of the magnetite particles is improved due to the mechanism of forming the sphere-like magnetite particles in the first step upon production, the particles do not coagulate with each other, have a large apparent density and as a result, the particles are excellent in the dispersibility and the thermo stability.

Although the reason why the sphericalness of the resultant sphere-like magnetite particles can be improved in the present invention has not yet been apparent at present, the present inventors considered that it may be attributable to the isotropic growth of magnetite nuclei as the result of dense and uniform growth of the magnetite nuclei by the addition of the water-soluble silicate in the first reaction step, and to the epitaxial growth of the magnetite in the second reaction step on the surface of the sphere-like magnetite particles of an improved sphericalness formed in the first reaction step.

The reason why the magnetite particles showing excellent thermo-stability can be obtained in the present invention has neither been clear at present. However, it may be attributable to the fact that the surface activity of the particles is reduced due to the improvement in the sphericalness of the sphere-like magnetite particles, as well as to the action of Si contained in the magnetite particles.

As a method for the addition of the water-soluble silicate in forming the magnetite particles, those methods as disclosed, for example, in Japanese Patent Publication No. 28203/1980 and Japanese Patent Application Laid-Open No. 2226/1983 can be mentioned. However, none of the above mentioned methods concerns the preparation of spherical magnetite particles. In addition, the water-soluble silicate added in these methods has an effect of suppressing the growth of particles when the magnetite particles are roasted under heating into sintered magnetite product or red iron oxide, and the effect is quite different from the effect of the water soluble silicate according to the present invention that controls the shape of the sphere-like magnetite particles formed in an aqueous suspension.

As the alkali hydroxide in the present invention, alkali metal hydroxide such as sodium hydroxide and potassium hydroxide and alkaline earth metal hydroxide such as magnesium hydroxide and calcium hydroxide can be used.

The amount of the alkali hydroxide used in the first reaction step according to the present invention is from 0.80 to 0.99 equivalent to $Fe^{2+}$ in the aqueous suspension of the ferrous salt.

If the amount is less than 0.80 or more than 0.99 equivalent, it is difficult to form sphere-like magnetite particles.

The reaction temperature in the first reaction step according to the present invention is from 70° C. to 100° C.

If the temperature is lower than 70° C., acicular geothite particles will be incorporated. On the other hand, although sphere-like magnetite particles can be formed even at a temperature higher than 100° C., it is not industrially advantageous.

Oxidation is performed by blowing an oxygen-containing gas (for example air) into the suspension.

The water-soluble silicate usable in the present invention includes sodium silicate or potassium silicate.

The amount of the water-soluble silicate added is from 0.1 to 5.0 atomic % (calculated as Si) to Fe.

If the Si content is less than 0.1 atomic %, it is impossible to obtain sphere-like magnetite particles with excellent sphericalness of the present invention.

On the other hand, if the Si content is more than 5.0 atomic %, the water-soluble silicate added is precipitated singly and incorporated into the sphere-like magnetite particles.

The water-soluble silicate in the present invention participates in the shape of the resultant sphere-like magnetite particles and accordingly, the water-soluble silicate should be added before the magnetite particles are formed by blowing an oxygen-containing gas into an aqueous reaction suspension of a ferrous salt containing colloidal ferrous hydroxide and, thus, the water-soluble silicate can be added either to the alkali hydroxide or to the aqueous reaction suspension of a ferrous salt containing colloidal ferrous hydroxide.

In the case where the water-soluble silicate is added to the aqueous solution of the ferrous salt, since the water soluble silicate is precipitated as $SiO_2$ simultaneously with the addition thereof, the purpose of the present invention can not be attained.

Substantially the whole amount of the water-soluble silicate added is contained in the magnetite particles produced and, as shown in Table 1, the resultant magnetite particles contain substantially the same amount of the silicate as the amount upon addition.

The amount of the alkali hydroxide used in the second step reaction in the present invention is not less than 1.00 equivalent to the residual $Fe^{2+}$ after the first reaction step.

If the amount is less than 1.00 equivalent, $Fe^{2+}$ can not be precipitated entirely. Accordingly, a preferred amount is selected from the amount not less than 1.00 equivalent while considering the industrial factors.

The reaction temperature at the second reaction step in the present invention may be the same as the temperature in the first reaction step. Furthermore, the same oxidation means as in the first reaction step may be used in the second reaction step.

The sphere-like magnetite particles according to the present invention, because of their improved sphericalness as shown in the examples, do not coagulate with each other and show a large apparent density and as the result, the sphere like magnetite particles according to the present invention are excellent in the dispersibility. In addition, the sphere like magnetite particles according to the present invention are excellent in the thermo-stability due to the reduced surface activity of the particles attributable to the improvement in the sphericalness of the particles and the action of Si contained in the particles. Accordingly, the sphere-like magnetite particles powder according to the present invention is suitable as the black pigment for use in painting and material for magnetic toners in electrostatic reproduction, which are most strongly demanded at present.

According to the present invention, sphere-like magnetic particles with a uniform particle size, showing excellent dispersibility and high tinting strength, as well as excellent in productivity such as easy filtration and pulverization can be obtained from the entire amount of $Fe^{2+}$ in the aqueous suspension of a ferrous salt while retaining no unreacted $Fe^{2+}$ therein.

When the sphere-like magnetite particles obtained according to the present invention are used in the production of a paint, since the particles have a satisfactory dispersibility in a vehicle, the physical property of the coated films such as gloss, clearness and durability can be improved and the working efficiency can be enhanced as well.

When the sphere like magnetite particles obtained according to the present invention are used for the preparation of magnetic toners, since the particles have a satisfactory dispersibility into the resin, it is possible to provide an adequate magnetization and obtain high picture quality excellent in the high bit image density. In addition, since the sphere-like magnetite particles according to the present invention are excellent in the thermo-stability, neither discoloration nor the reduction in the magnetic properties is caused upon production and development of magnetic toners.

The present invention will now be described referring to Examples and Comparative Examples.

In the following examples and comparative examples, the average particle size was determined according to the BET method and the oil absorption and the apparent density were measured by the method according to JIS K 5101. The tinting strength was measured by a color and color difference meter (TC-5D) made by Tokyo Denshoku Co., Ltd. while using a specimen for measuring color and indicated by the L value (luminosity) obtained. Lower L value for the specimen shows more excellent tinting strength and thus better dispersibility. The specimen for measuring the color was prepared by kneading 0.5 g of magnetite particles, 1.5 g of titanium white and 1.5 cc of castor oil in a Hoover muller into a paste, further kneading the thus kneaded admixture and 4.5 g of clear lacquor into a paint and coating the thus kneaded material on a mirror-coated paper using a 6 mil applicator.

The amount of Si in the particles was measured by carrying out X-ray fluorescence analysis using "X-ray Fluorescence Analyzer Model 3063M" made by Rigaku Industrial Corp. in accordance with JIS K 0119, "Fluorescent X-ray analysis: general rule".

EXAMPLE 1

Twenty liters of aqueous solution of a ferrous sulfate containing $Fe^{2+}$ of 1.5 mol/liter was added to 20 liters of an aqueous 2.85N solution of NaOH (corresponding to 0.95 equivalent to $Fe^{2+}$) prepared previously in a reaction vessel by adding 18.9 g of sodium silicate (#3) ($SiO_2$:28.55 wt %), so as to incorporate 0.3 atomic % of Si (calculated as Si) to Fe, and an aqueous suspension of the ferrous salt containing $Fe(OH)_2$ was formed at pH 6.9 and under the temperature of 90° C.

To the aqueous suspension of the ferrous salt containing $Fe(OH)_2$, air was blown at the rate of 100 liters/min at the temperature of 90° C. for 240 min to form an aqueous suspension of a ferrous salt containing magnetite particles.

Then, 2 liters of an aqueous 1.58N solution of NaOH (corresponding to 1.05 equivalent to $Fe^{2+}$) was added to the aqueous suspension of the ferrous salt containing magnetite particles, and air was blown at the rate of 20 liters/min at pH 11.8 and under the temperature of 90° C. for 60 min to form magnetite particles.

The resultant particles were washed with water, filtered, dried and then pulverized by the conventional method.

As shown from the Electron Microscopic Photograph in FIG. 1 ($\times 20,000$), the resultant magnetite particles were sphere-like particles that did not coagulate with each other and had an average particle size of 0.20 $\mu$m.

As the result of the fluorescent X-ray analysis, the sphere-like magnetite particles contained 0.29 atomic % of Si to Fe, and showed an apparent density of 0.57 g/cm$^3$, an oil absorption of 17 ml/100 g, an L value of 34.8 and the extremely excellent dispersibility.

EXAMPLES 2–10

Magnetite particles were obtained in the same manner as in Example 1 except for varying the kind, concentration and the amount of the aqueous solution of ferrous salt, the kind, concentration and the amount of the alkali hydroxide in the first reaction step, the kind, the amount and the addition time of the water soluble silicate, the kind and the amount of the alkali hydroxide in the second reaction step, as well as the reaction temperature in the first and second reaction steps.

The principal conditions for the production and the various properties of the resultant magnetite particles are shown in Table 1.

As the result of the microscopic observation, all of the magnetite particles obtained in Examples 2–10 did not coagulate with each other and were sphere-like particles.

Figure 2:

The electron microscopic photograph ($\times 20,000$) obtained in Example 3 is shown in FIG. 2.

COMPARATIVE EXAMPLE 1

Twenty liters of aqueous solution of ferrous sulfate containing $Fe^{2+}$ of 1.5 mol/liter was added to 20 liters of an aqueous 3.45N solution of NaOH (corresponding to 1.15 equivalent to $Fe^{2+}$) prepared previously in a reaction vessel and an aqueous suspension of a ferrous salt containing $Fe(OH)_2$ was formed at pH 12.8 and under the temperature of 90° C.

Air was blown at the rate of 100 liters/min under the temperature of 90° C. to the aqueous suspension of the ferrous salt containing $Fe(OH)_2$ for 220 min to form magnetite particles.

Figure 3:

As shown from the electron microscopic photograph ($\times 20,000$) in FIG. 3, the magnetite particles thus obtained were hexahedral particles.

The hexahedral magnetite particles showed an average particle size of 0.17 $\mu$m, an apparent density of 0.25 g/cm$^3$, an oil absorption of 29 ml/100 g and an L value of 40.1.

COMPARATIVE EXAMPLE 2

Twenty liters of aqueous solution of ferrous sulfate containing $Fe^{2+}$ of 1.5 mol/liter was added to 20 liters of an aqueous 1.92N solution of NaOH (corresponding to 0.64 equivalent to $Fe^{2+}$) prepared previously in a reaction vessel and an aqueous suspension of a ferrous salt containing $Fe(OH)_2$ was formed at pH 4.8 and under the temperature of 90° C.

Air was blown at the rate of 100 liters/min under the temperature of 90° C. for 190 min to the aqueous suspension of the ferrous salt containing Fe(OH)$_2$ to form magnetite particles.

Figure 4:
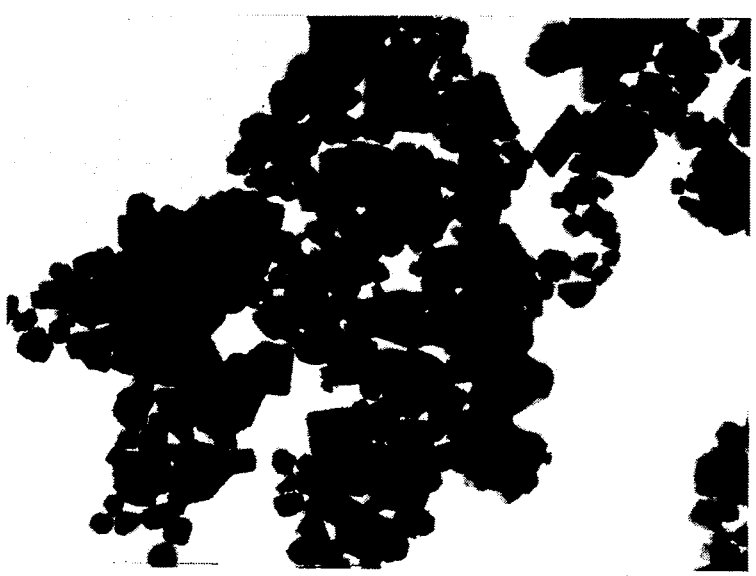

As shown from the electron microscopic photograph (×20,000) in FIG. 4, the resultant magnetite particles thus obtained were amorphous particles.

The amorphous magnetite particles showed an average particle size of 0.19 μm, an apparent density of 0.34 g/cm$^3$, an oil absorption of 27 ml/100 g and an L value of 39.0.

COMPARATIVE EXAMPLE 3

Twenty liters of aqueous solution of ferrous sulfate containing Fe$^{2+}$ of 1.5 mol/liter was added to 20 liter of an aqueous 2.85 N solution of Na$_2$CO$_3$ (corresponding to 0.95 equivalent to Fe$^{2+}$) prepared previously in a reaction vessel and the aqueous suspension of a ferrous salt containing FeCO$_3$ was formed at pH 6.6 and under the temperature of 90° C.

Air was blown at the rate of 100 liter/min at the temperature of 90° C. to the aqueous suspension of ferrous salt containing FeCO$_3$ for 240 min to form the aqueous suspension of ferrous salt containing magnetite particles.

Then, 2 liter of an aqueous 1.58N solution of NaOH (corresponding to 1.05 equivalent to Fe$^{2+}$) was added to the aqueous suspension of the ferrous salt containing magnetite particles and air was blown at the rate of 20 liters/min for 60 min at pH 11.6 and under the temperature of 90° C. to form magnetite particles.

The particles thus formed were washed with water, filtered, dried and pulverized by the conventional methods.

Figure 5:
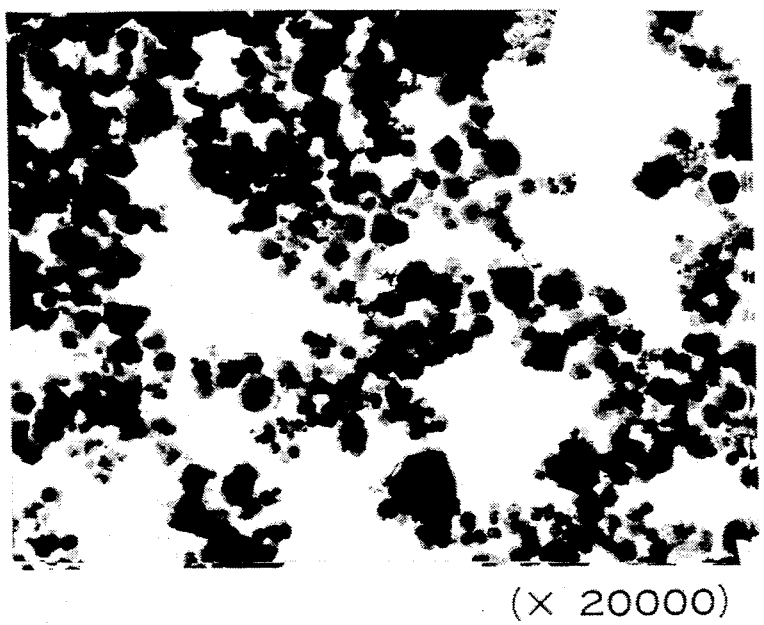

As shown from the electron microscopic photograph (×20,000) in FIG. 5, the resultant magnetite particles thus obtained were amorphous and could not be said spherical.

The magnetite particles showed a particle size of 0.12 μm, an apparent density of 0.29 g/cm$^3$, an oil absorption of 23 ml/100 liter and an L value of 38.4.

TABLE 1

| | Process for production sphere-like magnetite particles | | | | | | | | | | | | | Sphere-like magnetite particles | | | | |
|---|---|---|---|---|---|---|---|---|---|---|---|---|---|---|---|---|---|---|
| | First reaction step | | | | | | | | | | Second reaction step | | | | | | | |
| | Aqueous Fe$^{2+}$ solution | | | Alkali hydroxide | | | Water soluble silicate | | | | | | Alkali hydroxide | | | | | |
| Example | kind | concentration (mol/l) | amount (l) | kind | concentration (N) | amount $\left(\frac{\text{equivalent}}{\text{total Fe}^{2+}}\right)$ | kind | Fe/Si addition amount, atomic % | addition time* | reaction temp. (°C) | kind | amount $\left(\frac{\text{equivalent}}{\text{residual Fe}^{2+}}\right)$ | reaction temp. (°C) | average particle size (μm) | amount of absorbed oil (ml/100 g) | apparent density (g/cm³) | tinting strength (L value) | Si/Fe content (atomic %) |
| 1 | FeSO₄ | 1.5 | 20 | NaOH | 2.85 | 0.95 | sodium silicate | 0.3 | A | 90 | NaOH | 1.05 | 90 | 0.20 | 17 | 0.57 | 34.8 | 0.29 |
| 2 | " | " | " | " | " | " | sodium silicate | 1.0 | " | " | " | " | " | 0.18 | 16 | 0.61 | 34.0 | 0.98 |
| 3 | " | " | " | " | " | " | sodium silicate | 3.0 | " | " | " | " | " | 0.15 | 17 | 0.59 | 33.7 | 2.96 |
| 4 | " | " | " | " | " | " | potassium silicate | 0.3 | " | " | " | " | " | 0.21 | 18 | 0.58 | 35.2 | 0.29 |
| 5 | " | " | " | KOH | 3.72 | 0.93 | sodium silicate | 0.5 | " | 95 | KOH | 1.03 | 95 | 0.25 | 15 | 0.65 | 36.8 | 0.47 |
| 6 | " | " | " | " | " | " | sodium silicate | " | " | 80 | " | 1.01 | 90 | 0.16 | 19 | 0.45 | 33.4 | 0.47 |
| 7 | " | " | " | " | " | " | sodium silicate | " | B | 90 | NaOH | 1.05 | " | 0.19 | 17 | 0.55 | 35.0 | 0.48 |
| 8 | " | 2.0 | " | " | " | " | sodium silicate | 0.3 | A | 95 | " | 1.00 | 95 | 0.27 | 16 | 0.60 | 37.1 | 0.28 |
| 9 | FeCl₂ | 1.5 | " | NaOH | 2.91 | 0.97 | sodium silicate | 0.1 | " | 90 | KOH | 1.03 | " | 0.23 | 17 | 0.53 | 36.2 | 0.09 |
| 10 | " | 1.0 | " | KOH | 1.90 | 0.95 | sodium silicate | 0.5 | B | 85 | " | 1.10 | 90 | 0.09 | 21 | 0.41 | 33.0 | 0.49 |

(Note)
*A: added to alkali hydroxide
B: added to aqueous suspension in which Fe(OH)₂ is formed

What is claimed is:

1. Substantially spherical magnetite particles suitable for use as magnetic toners, having an apparent density of from 0.40 to 1.00 g/cm$^3$, an oil absorption value of 15 to 21 ml/100 g, a tinting strength (L value) of 33.0 to 37.1, and being thermally stable with respect to the magnetic properties and discoloration of the particles when exposed to temperatures at which the particles lose their magnetic properties and discolor during the production and development of the magnetic toners, and containing from 0.1 to 5.0 atomic % of Si to Fe, said Si being contained in the particles.

2. A process for producing substantially spherical magnetite particles suitable for use as magnetic toners, having an apparent density of from 0.40 to 1.00 g/cm$^3$, an oil absorption value of 15 to 21 ml/100 g, a tinting strength (L value) of 33.0 to 37.1, and being thermally stable with respect to the magnetic properties and discoloration of the particles when exposed to temperatures at which the particles lose their magnetic properties and discolor during the production and development of the magnetic toners and containing from 0.1 to 5.0 atomic % of Si to Fe, said Si being contained in the particle, comprising the steps of:

(a) oxidizing Fe(OH)$_2$ in an aqueous suspension at a temperature from 70° to 100° C. by blowing an oxygen-containing gas into an aqueous suspension containing colloidal Fe(OH)$_2$ obtained by reacting an aqueous solution of a ferrous salt with an alkali hydroxide of from 0.80 to 0.99 equivalent to Fe$^{2+}$ in an aqueous solution of the ferrous salt, wherein a water-soluble silicate is added into the alkali hydroxide or into the aqueous suspension containing colloidal Fe(OH)$_2$ before blowing the oxygen-containing gas thereto in an amount from 0.1 to 5.0 atomic % (calculated as SiO$_2$ to Fe of the ferrous salt), thereby forming particles of substantially spherical magnetite, (b) adding an alkali hydroxide of more than 1.00 equivalent to residual Fe$^{2+}$ in an aqueous suspension after the oxidation reaction to the aqueous suspension, and (c) subjecting the resultant aqueous suspension to oxidation treatment by blowing an oxygen-containing gas at a temperature from 70° to 100° C.

* * * * *